US 8,706,919 B1

(12) United States Patent
Eisner

(10) Patent No.: US 8,706,919 B1
(45) Date of Patent: Apr. 22, 2014

(54) SYSTEM AND METHOD FOR STORAGE AND RETRIEVAL OF PERSONAL PREFERENCE AUDIO SETTINGS ON A PROCESSOR-BASED HOST

(75) Inventor: Nicholas K. Eisner, Felton, CA (US)

(73) Assignee: Plantronics, Inc., Santa Cruz, CA (US)

(*) Notice: Subject to any disclaimer, the term of this patent is extended or adjusted under 35 U.S.C. 154(b) by 1176 days.

(21) Appl. No.: 10/437,346

(22) Filed: May 12, 2003

(51) Int. Cl.
*G06F 13/10* (2006.01)

(52) U.S. Cl.
USPC .................................. 710/8; 700/94

(58) Field of Classification Search
USPC ......... 345/700, 705, 708, 716, 744, 747, 978; 381/107; 700/94; 710/8, 62; 709/203; 713/1, 100
See application file for complete search history.

(56) References Cited

U.S. PATENT DOCUMENTS

| | | | | |
|---|---|---|---|---|
| 5,977,964 | A  * | 11/1999 | Williams et al. | 715/721 |
| 6,429,879 | B1 * | 8/2002  | Sturgeon et al. | 345/723 |
| 6,493,506 | B1 * | 12/2002 | Schoner et al. | 386/126 |
| 6,530,083 | B1 * | 3/2003  | Liebenow | 725/46 |
| 6,587,756 | B2 * | 7/2003  | Moriguchi et al. | 701/1 |
| 6,801,623 | B1 * | 10/2004 | Carter | 379/391 |
| 6,928,329 | B1 * | 8/2005  | Giaimo et al. | 700/94 |
| 2002/0068986 | A1 * | 6/2002 | Mouline | 700/94 |
| 2002/0072816 | A1 * | 6/2002 | Shdema et al. | 700/94 |
| 2003/0135539 | A1 * | 7/2003 | Kondo et al. | 709/201 |
| 2004/0003073 | A1 * | 1/2004 | Krzyzanowski et al. | 709/223 |
| 2004/0033819 | A1 * | 2/2004 | Hymel | 455/567 |
| 2004/0073430 | A1 * | 4/2004 | Desai et al. | 704/270.1 |

FOREIGN PATENT DOCUMENTS

JP        2002050978      *   2/2002

* cited by examiner

Primary Examiner — Ilwoo Park

(57) ABSTRACT

A system and method for automatic storage and retrieval of personal audio settings used with telephony or other audio or multimedia application software running on stand-alone or networked computers or other processor-based host systems are disclosed. The system generally includes an audio device adapted to communicate with a processor-based host executing an audio software application, the audio device having configurable user-specific settings associated therewith. The audio software application enables the host to store audio settings specific to each user and to selectively retrieve and apply user-specific settings to the audio device for the current user. Examples of audio settings include audio device model, inbound and outbound volume levels, tone, frequency response, and sidetone volume. The audio device communicates with the host via a communications port such as a USB port. The host may be on a network sharing access to a central audio settings storage with other processor-based hosts via the network. Each user may store audio settings for multiple audio device such that the audio software application selectively retrieves the audio settings for the current user and for the audio device being used by the current user.

18 Claims, 5 Drawing Sheets

SYSTEM AND METHOD FOR STORAGE AND RETRIEVAL OF PERSONAL PREFERENCE AUDIO SETTINGS ON A PROCESSOR-BASED HOST

BACKGROUND OF THE INVENTION

1. Field of the Invention

The present invention relates generally to telephony or other audio or multimedia applications using personal computers or other processor-based hosts. More specifically, a system and method for automatic storage and retrieval of personal audio settings used with telephony or other audio or multimedia application software running on stand-alone or networked computers or other processor-based host systems are disclosed.

2. Description of Related Art

Telephone or computer headsets are used extensively by operators, customer service agents such as in call centers, and/or other professionals who frequently use telephones or computer telephony applications. In addition, headsets are not only used with telephony applications but are widely used in a variety of computer and other multimedia applications, particularly with the convergence of computer and telephony technologies. Examples of headsets designed to connect to computers or other processor-based hosts include those adapted for various applications such as computer telephony (generally referred to as softphones), voice recognition, language or speech learning, audio listening for music, training, video, etc., and video game systems.

However, conventional headset systems using personal computers or other processor-based hosts typically do not allow users to store or retrieve user-configured settings. Examples of user headset settings include headset model, inbound and outbound volume levels, tone, frequency response, and sidetone volume when the headset is used for telephony applications. Although some conventional headset systems may allow a user to configure and store certain user settings, such systems cannot save settings for multiple headset users or multiple headsets, whether on a network or on a stand-alone device such as a personal computer or other processor-based host.

Examples where multiple headset users may share the use of a processor-based host at, for example, a work station include call centers, customer relationship management centers, office environments, or residences where softphone or audio users do not have a dedicated personal computer or other processor-based host. Rather, multiple users share a processor-based host and each user simply uses the first or only available host. For example, call centers, and particularly those in expensive facility locations, are moving toward an open seating environment where employees do not have a dedicated or assigned station but use any available station. With open seating, an employee is assigned to any available station for the work day (or shift) and may be assigned to a different station the next work day. Thus, each work station is shared by multiple employees.

Although some proprietary Automatic Call Distributor (ACD) systems in call centers support open seating environments, such systems generally use a passive headset architecture without an opportunity to customize and store multiple headset settings for multiple users. In particular, the employee may configure various user settings for the headset system while at the assigned station. However, those settings are only stored locally, if at all, at the PC located at the assigned station. When the employee is assigned to a different station the next work day, those user-configured settings cannot be retrieved from that different station and thus are lost. The employee would thus need to reconfigure the settings as desired at the newly assigned station at the beginning of each work day. As is evident, such reconfiguration of settings that typically do not change for a given user is not only inconvenient for the user but is also inefficient and not cost effective for the business.

Some call centers and offices achieve the open seating environment using VoIP by providing each employee with a laptop computer which may store a single set of user settings locally. While such a system using laptops takes advantage of the open architecture for a VoIP or other softphone application and takes advantage of some of the cost savings associated with open seating, it requires assigning a dedicated laptop to each employee and thus does not achieve the optimal user convenience, system security, and cost benefits of using desktop PCs.

As another example, multiple members of a household may use one or more headsets on a shared PC. Each member of the household typically has a different set of desired headset settings. Although one member of the household may be able to configure and save his desired settings on the PC, those settings are lost and thus irretrievable when another member of the household modifies those settings. Again, the need for each member of the household to reconfigure the headset settings each time those settings are modified by another member of the household renders the headset inconvenient to configure and use.

Thus, what is needed is a system and method to automatically store and retrieve user audio settings for multiple users. Ideally, the system and method enable a processor-based host to store settings for multiple users and to automatically load the stored settings for a particular user when that user logs on, thereby resulting in convenience for the user and in cost efficiency where the system is used in a business environment.

SUMMARY OF THE INVENTION

A system and method for automatic storage and retrieval of personal audio settings used with telephony or other audio or multimedia application software running on stand-alone or networked computers or other processor-based host systems are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The system generally includes an audio device adapted to communicate with a processor-based host executing an audio software application, the audio device having configurable user-specific settings associated therewith. The audio software application enables the host to store audio settings specific to each user and to selectively retrieve and apply user-specific settings to the audio device for the current user. Examples of audio devices include telephone headsets, telephone handsets, and headphones.

A method for configuring and storing audio settings for future retrieval and application of the stored audio settings generally includes receiving and storing user identification and user-specific audio settings for each user for future selective retrieval and application of the audio settings for a current user by a processor-based host in communication with an audio device such as a headset, handset or headphones.

A method for retrieving and applying stored user-specific audio settings to an audio device generally includes identifying a current user of the audio device in communication with a processor-based host, retrieving stored user-specific audio settings for the current user selected from settings for a plurality of users, and applying the retrieved audio settings to the audio device used by the current user via the processor-based host using a software application.

Examples of audio settings include headset/handset/headphones model, inbound and outbound volume levels, tone, frequency response, and/or sidetone volume. The audio device preferably communicates with the host via a wired communications port such as a USB port or a sound card, or a wireless communications port such as Bluetooth, 802.11 or DECT. The host may be on a network sharing access to a central audio settings storage with other processor-based hosts via the network. Each user may store audio settings for multiple audio devices such that the audio device software application selectively retrieves the audio settings for the current user and for the audio device being used by the current user. The specific audio device being used may be automatically detected by the audio software application or may be input by the user.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

A system and method for automatic storage and retrieval of personal audio settings used with telephony or other audio or multimedia application software running on stand-alone or networked computers or other processor-based host systems are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
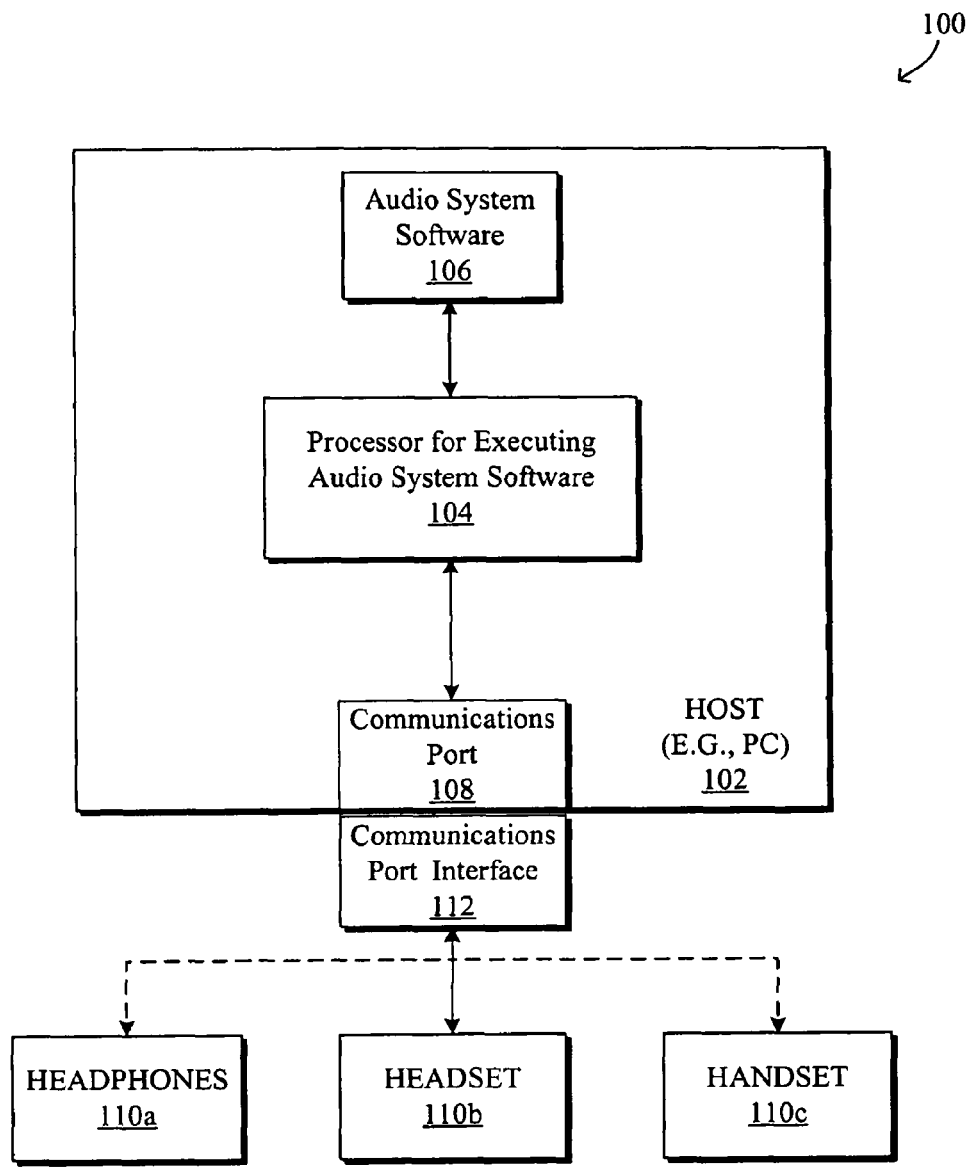
FIG. 1 is a block diagram illustrating an exemplary audio device system on a processor-based host device for storing, retrieving, and managing settings for multiple users.

FIG. 1 is a block diagram illustrating an example of an audio device and host system 100. The system generally includes an audio device 110 in communication with a processor-based host 102. The audio device 110 is in communication with the host 102 such as via a communications port interface 112 for the audio device 110 and a communications port 108 for the host 102. Any suitable communications port or mechanism may be employed. Examples include wired communications connections such as USB and sound card (2×3.5 mm), and wireless communications connections such as Bluetooth, 802.11, and DECT. The audio device 110 may be headphones 110a, headset 110b, or a handset 110c. It is noted that these audio devices 110 are merely examples of suitable audio devices. Any other suitable audio devices may additionally or alternatively be employed. The processor-based host 102 may be a personal computer (PC), for example or may be any other suitable processor-based device such as a personal digital assistant (PDA) or a processor-based telephone. As shown, the host 102 includes a processor 104 for executing an audio system software or application 106. The communications port 108 provides the audio device 110 with an electrical source as well as access to the processor 104 on the host executing the audio system software 106. The communications port 108 also enables the audio device 110 to be personalized for each user as will be described in more detail below.

The audio system software 106 allows users to configure various audio settings for each audio device and/or for each user. Examples of audio settings include audio device model, inbound and outbound volume levels, tone, frequency response, and sidetone volume. The audio system software 106 enables storage, retrieval, and management of audio settings via the host 102. In particular, the processor 104, in executing the audio system software 106, retrieves the corresponding set of user audio configurations as stored and applies them to the audio device 110 via the communications port 108. The processor 104 typically applies the stored audio settings to the audio device 110 by processing the digital signals received from and/or to be transmitted to the audio device 110 in accordance with the retrieved audio settings. The user may also manage and modify the audio configurations via a user interface (not shown) of the audio system software 106. The user may then cause the host 102 to store the modified audio configurations for subsequent retrieval and application.

The audio system software 106 preferably enables management of audio device configurations for multiple audio devices and/or for multiple audio device users. For example, multiple users may share the use of the host 102 for use with one or more audio devices. Alternatively or additionally, each user may use multiple audio devices such as a headphones 110a for audio and/or multimedia use such as video game systems, a headset 110b for use with a telephone and/or voice recognition software, and a handset 110c for telephone use. The various audio devices 110 are preferably controlled and managed by the same audio system software 106. Alternatively, a corresponding audio system software 106 may be provided for each different audio device 110*a*, 110*b*, 110*c*.

Figure 2:
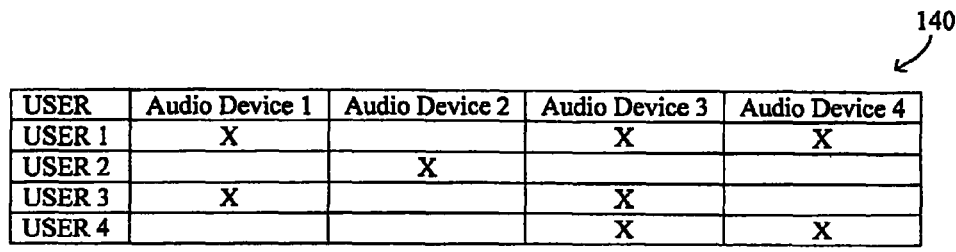
FIG. 2 is a table illustrating audio configurations stored for multiple users, where audio configurations for one or more audio devices are stored for each user.

FIG. 2 is a table 140 illustrating audio configurations stored for multiple users, where audio configurations for one or more audio devices are stored for each user. The audio configurations for the various audio devices may be stored on and applied by a stand-alone host. In the example shown, the stored audio configurations supports four users and various audio devices. For example, User 1 has stored audio configurations for audio devices 1, 3, and 4 and User 2 has stored audio configurations for audio device 2. As noted, the audio system software may support multiple audio devices for multiple users. In other words, each user may have a different set of stored audio configurations for each audio device that the user may use and each set of stored audio configurations is preferably optimized for the specific user for the particular audio device. Alternatively, the audio configurations may be stored on a server or other storage device on a network and applied by a local host, as will be described in more detail below with reference to FIG. 3.

Figure 3:
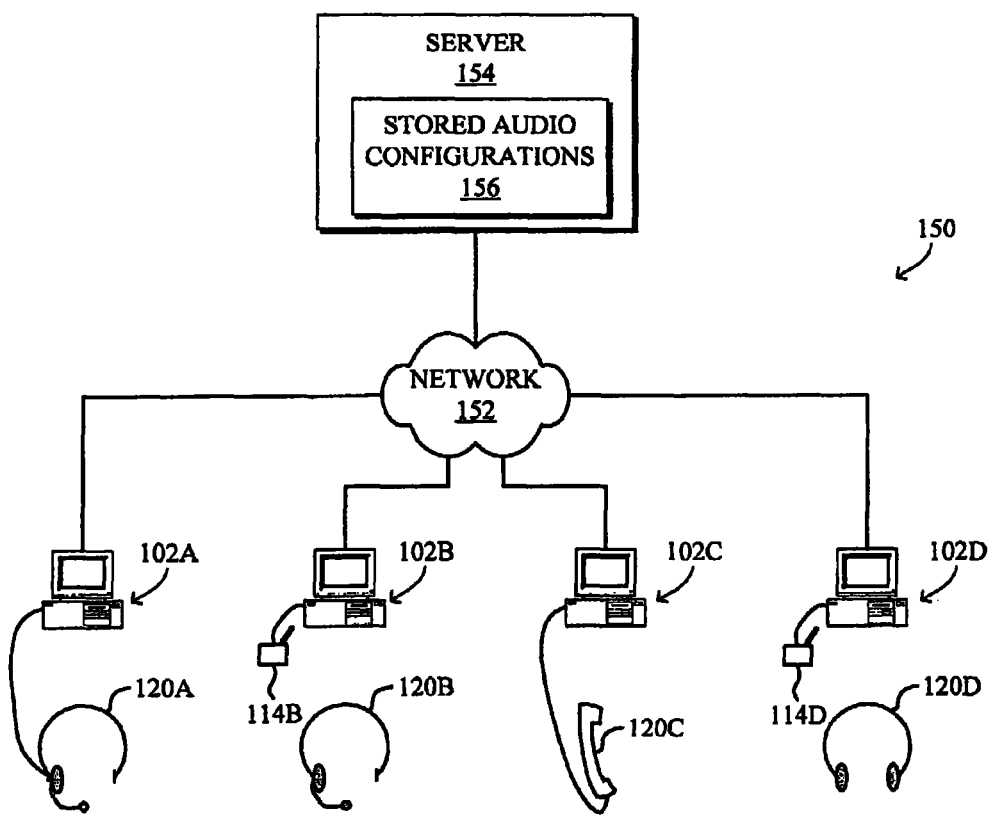
FIG. 3 is a block diagram illustrating an exemplary networked configuration with multiple local processor-based host devices for storing, retrieving, and managing audio configurations for multiple users.

FIG. 3 is a block diagram illustrating exemplary audio devices and host systems in a networked configuration 150. The network may be via a local area network (LAN), a wired and/or wireless network, or any other suitable network. As shown, the networked configuration 150 includes multiple local processor-based hosts 102A, 102B, 102C, and 102D on a network 152 for storing, retrieving, and managing audio configurations for multiple users. The hosts 102 on the network 152 may be served by a network server 154. It is noted that although the networked configuration 150 shown includes four local hosts 102A-102D, the networked configuration 150 may be configured to support any suitable number of local hosts 102, at least one of which supports the use of audio devices. In addition, although the embodiment shown includes a single server 154 serving the multiple hosts 102 as clients, it is to be understood that any other network configuration may be implemented. For example, the networked may alternatively be a distributed network such that any or all local hosts 102 may serve as a server to any or all other local hosts 102.

Each processor-based host 102A, 102B, 102C, 102D is in communication with a corresponding audio device 110A, 110B, 110C, and 110D, respectively. Although not specifically shown, each host 102 includes a processor for executing an audio system software and a communications port for communicating with a communications port interface of the audio device 110, similar to the audio device and host system shown and described above with reference to FIG. 1. In particular, the local host applies the applicable audio configuration to the corresponding audio device via the communications port and the communications port interface. The audio system software may be resident on each host 102 or may be served up by the server 154 over the network 152. In either case, the audio configurations for the multiple users and/or the multiple audio devices are preferably collectively stored in a combined audio configuration storage 156. Preferably, the audio configurations 156 for all the users and/or audio devices are centrally stored in and retrieved from the server 154. Alternatively, such as in a distributed network noted above, the various local hosts 102 may each store a copy of the audio configurations which are updated across the network, for example, each time one or more of the audio configuration are modified.

A user may log onto a local host 102A and connect a headset 120A to the local host 102A. Upon executing the audio system software at the local host 102A, the local host 102A retrieves the audio configurations corresponding to the user and/or to the particular headset 120A stored on the network. The local host 102A applies the retrieved configurations to the headset 120A with which it is in communication. Typically, the headset 120A has a wire connection to the host 102A via a communications port such as a USB port on the host and a USB connector of the headset 120A, as shown and described above with reference to FIG. 1. However, any other suitable wired or wireless audio devices may be utilized. For example, as shown in FIG. 3, a handset 120C may be in communication with a local host 102C via a wired connection. A wireless headset 120B and wireless headphones 120D may be in wireless communication with the local host 100B, 102D via a wireless transceiver 114B, 114D which may in turn be in wired communication with the communications port (not shown) of the host 102B, 102D, respectively.

As is evident, a user may log onto any local host 102 on the network and the local host 102 would execute the audio system software to automatically retrieve and apply the stored audio configurations corresponding to the user. By implementing the audio system software over the networked configuration 150, an open seating environment where employees do not have a dedicated or assigned station but use any available station can be implemented easily and efficiently.

In addition to storing and managing audio configurations for multiple users, the audio system software may also enable storage and retrieval of multiple audio configurations for each user. In particular, a given user may select from various audio devices depending upon the particular application for which the audio device is used, e.g., telephony, audio listening, training, computer gaming and/or voice recognition application. Thus, the audio system software preferably associates audio configuration settings not only to a user but also to the particular audio device used by the user. The audio system software would typically utilize the user's logon ID and optional password and may also utilize the user's selection of a particular audio device in order to retrieve and apply the appropriate audio configurations. For example, the user may enter the selected audio device to the audio system software or the audio system software may automatically detect the particular audio device once the audio device is in communication with the local host.

Figure 4:
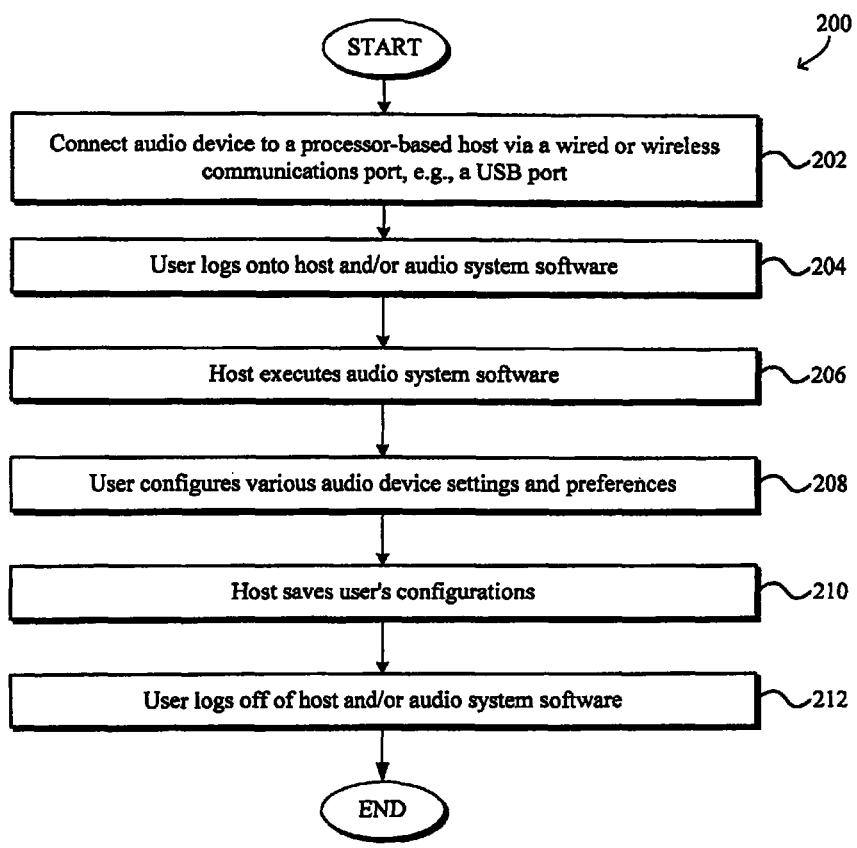
FIG. 4 is a flow chart illustrating a process for configuring and storing a user's personal audio settings on a processor-based host shared by multiple users for future retrieval and application.

FIG. 4 is a flow chart illustrating a process 200 for configuring and storing a user's personal audio settings on a processor-based host shared by multiple users for future retrieval. At step 202, the user connects an audio device to a processor-based host via a communications port, such as via a USB port. Step 202 is optional to process 200 as it is unnecessary although desirable to have the audio device connected to the local host while the user configures and stores the audio settings. At step 204, the user logs onto the local host, the network, and/or to the audio system software. At step 206, the local host executes the audio system software, either locally or over the network.

At step 208, the user may configure various audio settings to the user's preference. Examples of various audio settings include volume, tone, frequency response, and/or sidetone. Preferably, the audio device is in communication with the local host during this step such that the user may optimize the various settings by testing the results of adjusting the various audio settings using the audio device. By optimizing the audio settings for each user and optionally for each audio device used by the user, the user improves the intelligibility, thereby improving communication, productivity and/or customer satisfaction.

At step 210, the host stores the audio configuration. As discussed above, the audio configuration may be stored locally such as is typically case for a stand-alone host. Alternatively, the audio configuration may be stored over a network where the host is in a networked configuration. The stored audio configuration may be associated with the user and optionally with a particular audio device as the user may use multiple audio device depending upon the particular application. The user may then log off of the host and/or audio system software at step 212.

As is evident, the flowchart of FIG. 4 illustrates merely one example of a suitable manner for using the audio system software to configure and store a user's personal audio settings on a processor-based host shared by multiple users for future retrieval and application. For example, steps 202-206 may be performed in any suitable order. As another example, once configured, the audio system software may apply the audio configurations to the audio device prior to the user logging off of the host and/or audio system software at step 212 so that the user may test the audio configurations and/or use the audio device. As yet another example, the process of configuring the audio configurations may be iterative in that after one or more audio settings, e.g., the sidetone volume, are adjusted, the audio configurations may be saved and applied by the audio system software so that the modified configurations can be tested by the user to determine whether the audio settings have been optimally configured. The process may further include administering a hearing test and automatically adjusting the signal that user receives according to the results of the hearing test to accommodate for whatever hearing loss from which the user may suffer. As most adults over the age of 30 have some form of hearing loss, the hearing test will facilitate in improving intelligibility of the audio output. Individualized corrections may be stored in the same or similar way the other configurations are stored and may drive a certain level of multi-band compression, similar to the technology used in hearing aids.

Figure 5:
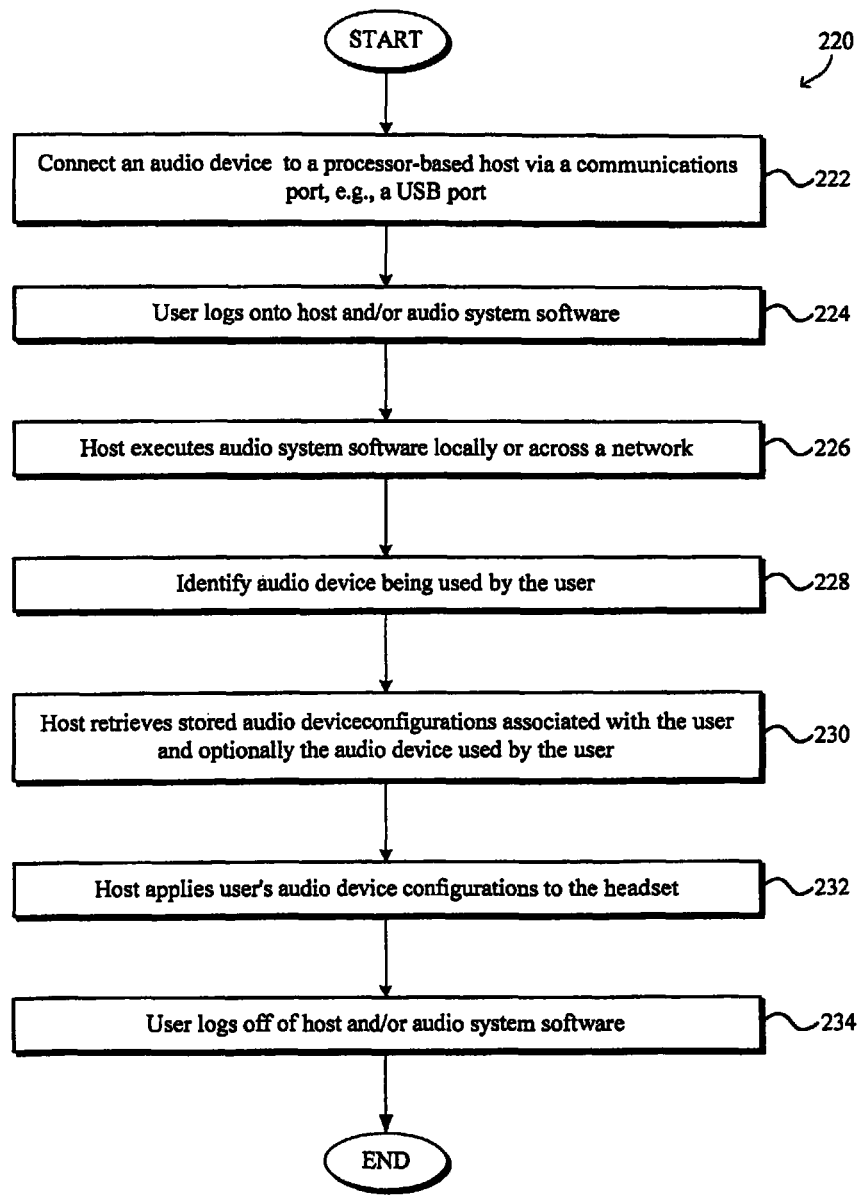
FIG. 5 is flow chart illustrating a process for retrieving and applying a user's personal audio settings stored on a processor-based host shared by multiple users.

FIG. 5 is flow chart illustrating a process 250 for retrieving a user's personal stored audio configurations and applying the settings to the user's audio device. In particular, at step 222, the user connects the audio device to the processor-based host via a communications port such as a USB port. At step 224, the user logs onto the local host, the network, and/or to the audio system software. At step 226, the local host executes the audio system software, either locally or over the network as discussed above.

At step 228, the audio device being used by the user is optionally identified to the audio system software. For example, the audio system software maybe adapted to automatically detect the audio device model being used. Alternatively, the user may enter the audio device model information via, for example, an audio system software user interface. This step is unnecessary if, for example, the user has configured and stored audio configurations for only one audio device or if there is a designated default audio device.

At step 230, the local host uses the user identification (such as the user login and/or password) and optionally the audio device model information to retrieve the appropriate audio configurations. Preferably, a default audio device is designated for each user. Alternatively, the same default audio device may be designated for all users or a selected subset of the users. The audio configurations are typically either stored locally such as may be the case for a stand-alone host or stored on a network server such as may be the case for a host acting as a client in a network. At step 232, the host executing the audio system software applies the retrieved audio configurations to the audio device via a communications port such as the USB port. After the user is done using the audio device and/or the host, the user may then log off the audio system software and/or the host at step 234.

As is evident, the flowchart of FIG. 5 illustrates merely one example of a suitable manner for using the audio system software to retrieve and apply a user's personal audio settings by a processor-based host shared by multiple users. For example, steps 222-226 may be performed in any suitable order. As another example, the process of retrieving and applying a user's personal audio settings may integrate all or portions of the audio configuring and storing process 200 shown and described above with reference to FIG. 4. In other words, the user may modify the audio configurations during a single logon session and/or during audio device use in order to adapt to changes in the environment, e.g., background noise.

The audio device and audio software system used in connection with a processor-based local host enables audio configurations for multiple users to be configured and stored on the local host or on a network and subsequently retrieved and applied by the local host. An individual user's stored audio configurations can be selectively retrieved and applied to the audio device by the host executing the audio software. The audio device and software system enables a user to use any host in the network without having to reconfigure the audio configurations each time the user switches to a different host. Such a system is particularly suited for use in a call center with an open seating environment. The system also enables multiple users to use the same host, whether a stand-alone host or a host in a network, without having to reconfigure the audio configurations when another user applies his personal settings to the audio device. The system further enables a user to switch among multiple audio devices without having to reconfigure the audio device each time a different audio device is used. Thus, the system increases the ease of use and improves efficiency and productivity.

One application of the audio device and software system is a headset in conjunction with voice over Internet Protocol (VoIP) or other types of soft phones, i.e., software telephones that run on a personal computer, or on other audio devices.

Although the processor-based host is typically a PC, the host may be any other device such as a telephone, a personal digital assistant (PDA), a DVD player, or a digital video recorder (DVR). The audio device and software system can be used in a residential or business environment for added convenience, cost efficiency, and productivity.

Figure 6:
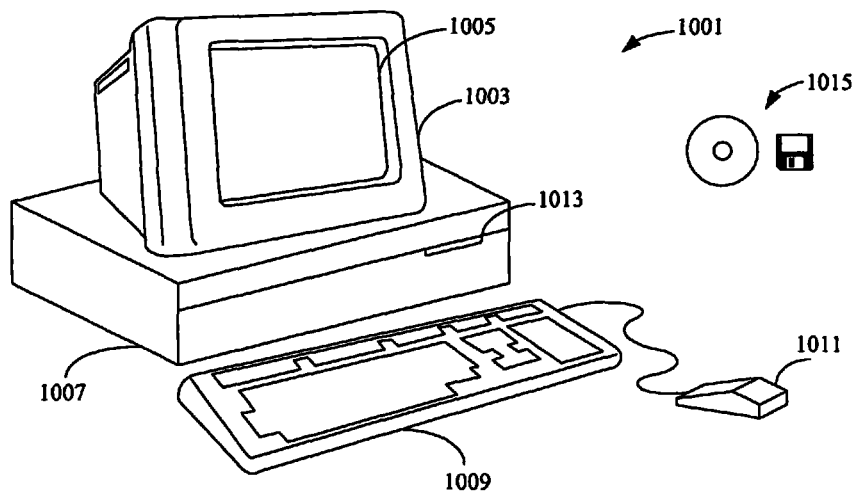
FIG. 6 illustrates an example of a computer system that can be utilized with the various embodiments of method and processing described herein.
Figure 7:
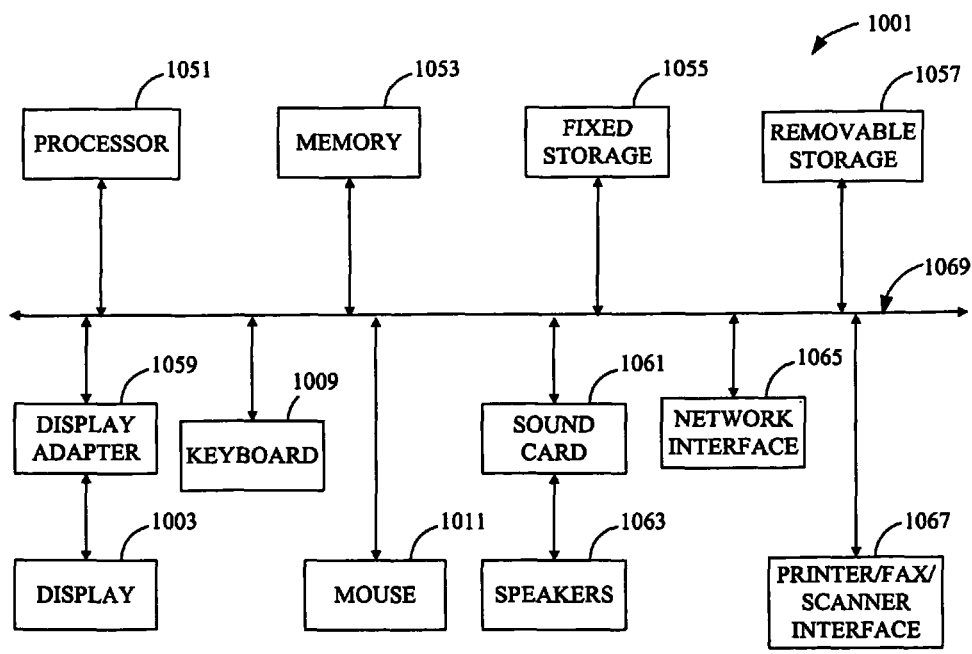
FIG. 7 illustrates a system block diagram of the computer system of FIG. 6.

FIGS. 6 and 7 illustrate a schematic and a block diagram, respectively, of an exemplary general purpose computer system 1001 suitable for executing software programs that implement the methods and processes described herein. The architecture and configuration of the computer system 1001 shown and described herein are merely illustrative and other computer system architectures and configurations may also be utilized.

The exemplary computer system 1001 includes a display 1003, a screen 1005, a cabinet 1007, a keyboard 1009, and a mouse 1011. The cabinet 1007 typically houses one or more drives to read a computer readable storage medium 1015, a system memory 1053, and a hard drive 1055 which can be utilized to store and/or retrieve software programs incorporating computer codes that implement the methods and processes described herein and/or data for use with the software programs, for example. A CD and a floppy disk 1015 are shown as exemplary computer readable storage media readable by a corresponding floppy disk or CD-ROM or CD-RW drive 1013. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as floptical disks, and specially configured hardware devices such as application-specific integrated circuits (ASICs), programmable logic devices (PLDs), and ROM and RAM devices.

Further, computer readable storage medium may also encompass data signals embodied in a carrier wave such as the data signals embodied in a carrier wave carried in a network. Such a network may be an intranet within a corporate or other environment, the Internet, or any network of a plurality of coupled computers such that the computer readable code may be stored and executed in a distributed fashion.

The computer system 1001 comprises various subsystems such as a microprocessor 1051 (also referred to as a CPU or central processing unit), system memory 1053, fixed storage 1055 (such as a hard drive), removable storage 1057 (such as a CD-ROM drive), display adapter 1059, sound card 1061, transducers 1063 (such as speakers and microphones), network interface 1065, and/or printer/fax/scanner interface 1067. The computer system 1001 also includes a system bus 1069. However, the specific buses shown are merely illustrative of any interconnection scheme serving to link the various subsystems. For example, a local bus can be utilized to connect the central processor to the system memory and display adapter.

Methods and processes described herein may be executed solely upon CPU 1051 and/or may be performed across a network such as the Internet, intranet networks, or LANs (local area networks) in conjunction with a remote CPU that shares a portion of the processing.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. An audio system, comprising:
   an audio device adapted to communicate with a processor-based host, the audio device having user-specific audio settings associated therewith, the user-specific audio settings being configurable; and
   an audio software application executable by the processor-based host, the audio software application configured to automatically identify the audio device being used by the current user from among a plurality of potential audio devices, and further configured to enable the processor-based host to store audio settings specific to each of a plurality of audio device users and to selectively retrieve and apply the stored audio settings specific to one of the plurality of the audio device users to the audio device, the one of the plurality of the audio device users being a current user of the audio device, the processor-based host being configured to process, in executing the audio software application, audio signals received from the audio device and audio signals transmitted to the audio device in accordance with the retrieved audio settings specific to the current user of the audio device, wherein the retrieved audio settings include at least one user-configurable audio setting utilized by the host in processing audio signals during reception from the audio device.

2. The system of claim 1, wherein at least one of the user-specific audio settings is selected from the group consisting of audio device model, inbound volume level, outbound volume level, tone, frequency response, and sidetone volume.

3. The system of claim 1, wherein the audio device communicates with the processor-based host via a corded or cordless communications port.

4. The system of claim 3, wherein the communications port is a USB port and wherein the audio device includes a USB connector configured to communicate with the processor-based host via the USB port.

5. The system of claim 1, further comprising the processor-based host.

6. The system of claim 1, further comprising:
   a plurality of said processor-based hosts configured to communicate in a network; and
   a central storage on the network for storing the audio settings associated with the plurality of audio device users, the central storage being accessible to each of the plurality of processor-based hosts on the network, each processor-based host being configured to selectively retrieve and apply the stored audio settings specific to the current user of the audio device across the network from the central storage.

7. The system of claim 1, wherein the audio software application is further configured to enable the processor-based host to store audio settings specific to each of a plurality of audio devices for each audio device user and to selectively retrieve and apply the stored audio settings specific to the current user and specific to the audio device being used by the current user.

8. A method for configuring and storing audio settings for future retrieval and application of the stored audio settings, comprising:
   receiving input including user identification and user-specific audio settings for each of a plurality of audio device users; and
   storing the user identification and the audio settings associated with each audio device user for future selective retrieval and application of the stored audio settings for one of the plurality of the audio device users by a processor-based host in communication with an audio device used by a current user of the audio device, the current user of the audio device being one of the plurality of the audio device users, the processor-based host being configured to process audio signals to be received from the audio device and audio signals to be transmitted to the audio device in accordance with the retrieved audio settings specific to the current user of the audio device, wherein the retrieved audio settings include at least one user-configurable audio setting utilized by the host in processing audio signals during reception from the audio device to transmit outbound to a far end listener.

9. The method of claim 8, wherein the at least one of the user-configurable audio setting utilized by the host in processing audio signals during reception from the audio device to transmit outbound to a far end listener comprises outbound volume level.

10. The method of claim 8, wherein the storing is to a central storage accessible to the processor-based host via a network.

11. The method of claim 8, wherein the input further includes user audio settings specific to each of a plurality of audio devices for at least one of the audio device users such that the future selective retrieval and application of the stored audio settings is for a specific audio device being used by the current audio device user.

12. The method of claim 8, wherein the processor-based host is further configured to automatically identify the audio device being used by the current user from among a plurality of potential audio devices.

13. A method for retrieving and applying stored user-specific audio settings to an audio device, comprising the steps of:
- identifying a current user of an audio device in communication with a processor-based host;
- automatically identifying the audio device being used by the current user from among a plurality of potential audio devices; and
- retrieving stored user-specific audio settings, the user-specific audio settings corresponding to the current user and selected from audio settings for a plurality of users; and
- applying the retrieved audio settings to the audio device used by the current user via the processor-based host using an audio software application by processing audio signals received from the audio device and audio signals transmitted to the audio device in accordance with the retrieved audio settings specific to the current user of the audio device, wherein the retrieved audio settings include at least one user-configurable audio setting utilized by the host in processing audio signals during reception from the audio device.

14. The method of claim 13, wherein the retrieved stored audio settings are further selected from audio settings for the plurality of audio devices associated with the user.

15. The method of claim 13, wherein at least one of the user-specific audio settings is selected from the group consisting of audio device model, inbound volume level, outbound volume level, tone, frequency response, and sidetone volume.

16. The method of claim 13, wherein the retrieving is from one of the processor-based host and a central storage accessible by the processor-based host via a network.

17. The method of claim 13, wherein the audio device is in communication with a processor-based host via a communications port of the host.

18. The method of claim 16, wherein the communications port is a USB port and wherein the audio device includes a USB connector configured to communicate with the processor-based host via the USB port.

* * * * *